(12) United States Patent
Park et al.

(10) Patent No.: US 9,886,191 B2
(45) Date of Patent: *Feb. 6, 2018

(54) METHOD AND APPARATUS FOR PROVIDING CHARACTER INPUT INTERFACE

(75) Inventors: Sung Wook Park, Gyeonggi-do (KR); Se Hwan Park, Gyeonggi-do (KR); Ji Hoon Kim, Seoul (KR); Ji Hoon Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 868 days.

This patent is subject to a terminal disclaimer.

(21) Appl. No.: 13/436,065

(22) Filed: Mar. 30, 2012

(65) Prior Publication Data

US 2012/0313858 A1 Dec. 13, 2012

(30) Foreign Application Priority Data

Jun. 10, 2011 (KR) .......................... 10-2011-0055955

(51) Int. Cl.
*G06F 3/0488* (2013.01)
*G06F 3/0484* (2013.01)
*G06F 3/023* (2006.01)
*G06F 3/01* (2006.01)

(52) U.S. Cl.
CPC .......... *G06F 3/04886* (2013.01); *G06F 3/018* (2013.01); *G06F 3/0238* (2013.01); *G06F 3/04847* (2013.01); *G06F 3/04883* (2013.01)

(58) Field of Classification Search
CPC .................................................. G06F 3/04886
USPC ......... 345/171, 173, 181; 382/181; 704/3, 4; 715/773

See application file for complete search history.

(56) References Cited

U.S. PATENT DOCUMENTS

| 2002/0167545 A1 | 11/2002 | Kang et al. |
| 2005/0089226 A1* | 4/2005 | Chang et al. ................. 382/181 |
| 2007/0222769 A1 | 9/2007 | Otsuka |
| 2008/0046496 A1 | 2/2008 | Kater |

(Continued)

FOREIGN PATENT DOCUMENTS

| EP | 1 923 779 | 5/2008 |
| EP | 2 079 010 | 7/2009 |

(Continued)

OTHER PUBLICATIONS

European Search Report dated Nov. 3, 2014 issued in counterpart application No. 12797560.5-1972.

(Continued)

*Primary Examiner* — Sepehr Azari
(74) *Attorney, Agent, or Firm* — Jefferson IP Law, LLP

(57) ABSTRACT

A method and an apparatus for providing a character input interface are provided. The method for providing a character input interface in a terminal having a touchscreen, includes simultaneously displaying a first keyboard on a first region and a second keyboard including second keyboard language selection keys on a second region by the touchscreen in a character inputting mode; and changing a language of the second keyboard to a language corresponding to a second touched keyboard language selection key touched while maintaining a language of the first keyboard when input touching the second keyboard language key is received.

32 Claims, 14 Drawing Sheets

(56) References Cited

U.S. PATENT DOCUMENTS

| | | |
|---|---|---|
| 2008/0082934 A1 | 4/2008 | Kocienda et al. |
| 2008/0117171 A1 | 5/2008 | Kwak |
| 2008/0225006 A1 | 9/2008 | Ennadi |
| 2008/0259039 A1 | 10/2008 | Kocienda et al. |
| 2009/0189865 A1* | 7/2009 | Mishra .......................... 345/173 |
| 2011/0078567 A1 | 3/2011 | Kim et al. |
| 2012/0310622 A1* | 12/2012 | Zivkovic et al. ................. 704/3 |

FOREIGN PATENT DOCUMENTS

| | | |
|---|---|---|
| EP | 2 293 168 | 3/2011 |
| EP | 2 431 842 | 3/2012 |
| JP | 2007-257220 | 10/2007 |
| JP | 2008-305294 | 12/2008 |
| KR | 1020040056700 | 7/2004 |
| KR | 1020110035724 | 4/2011 |
| WO | WO 2010/089918 | 8/2010 |

OTHER PUBLICATIONS

Hashimoto Kaznori, "Smart Operations by "Limiting" the Input Mode", Ipod Touch Business Utility, First Edition, Mar. 7, 2011, 9 pages.

Japanese Office Action dated Mar. 14, 2016 issued in counterpart application No. 2014-514789, 17 pages.

* cited by examiner

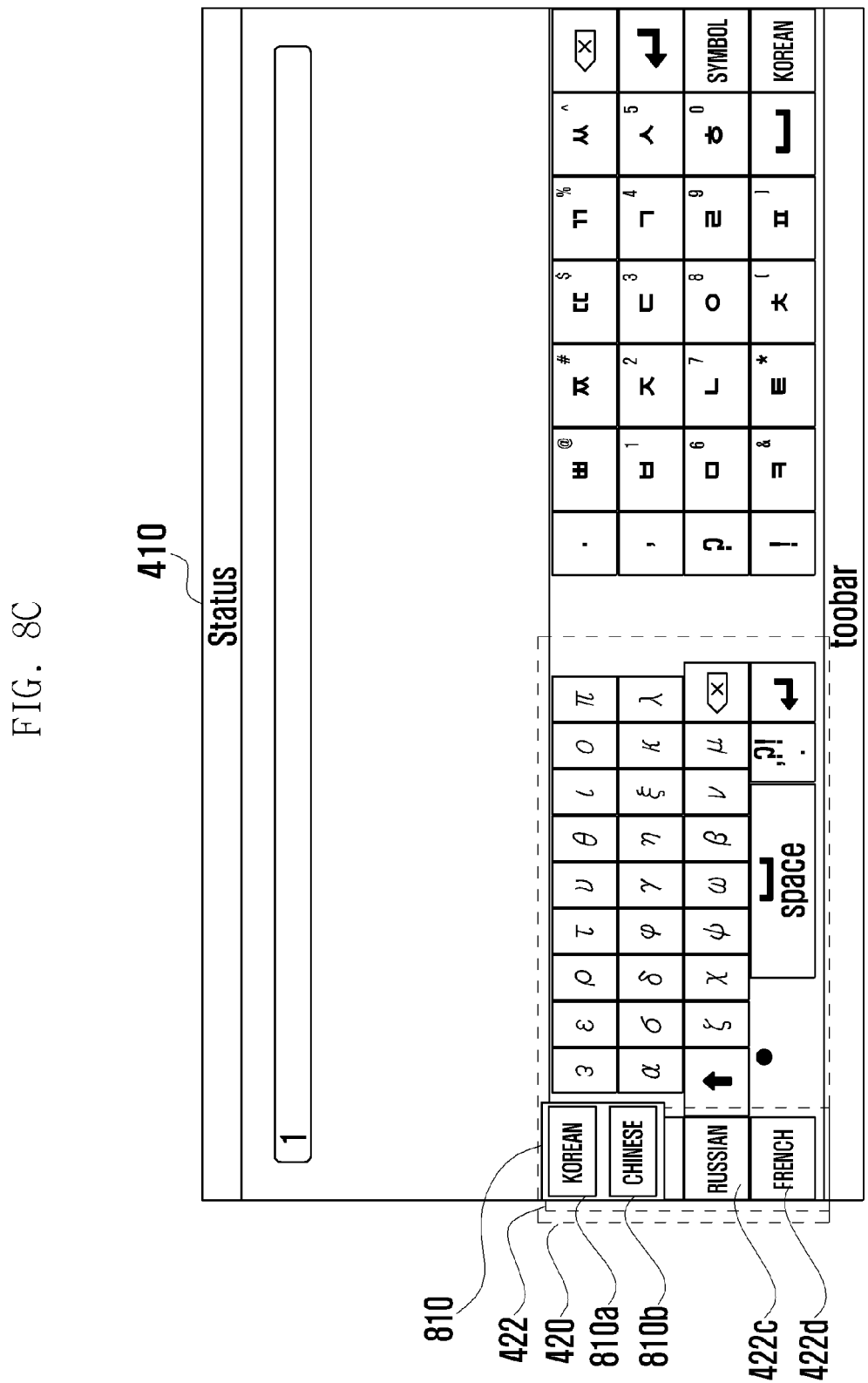

METHOD AND APPARATUS FOR PROVIDING CHARACTER INPUT INTERFACE

PRIORITY

This application claims priority under 35 U.S.C. § 119(a) to an application filed in the Korean Intellectual Property Office on Jun. 10, 2011, and assigned Serial No. 10-2011-0055955, the entire disclosure of which is incorporated herein by reference.

BACKGROUND OF THE INVENTION

1. Field of the Invention

The present invention relates generally to a method and an apparatus for providing a character input interface, and more particularly, to a method and an apparatus for providing a convenient virtual keyboard in a touch terminal.

2. Description of the Related Art

Recently, with the development of communication technology, an input device, and a display device, terminals having touch interfaces such as smartphones or tablet PCs have been widely used.

A touch interface for a terminal having a small screen such as a mobile phone or an MP3 player has been developed and provided. Consequently, the size of a screen is restricted and accordingly only one input mode (Korean language, English language, numerals, symbols, and the like) is provided to a user. However, recently, devices such as tablet PCs, which provide a relatively large screen, have become available. There is a need for an interface that enables a user to efficiently use a large screen.

Chunjiin and Naratgul keyboard layouts have been widely used as a keyboard interface in a small terminal such as a mobile phone. Now, a keyboard interface for a small terminal is applied to a terminal having a large screen. The size of each key and a distance between keys in a keyboard are relatively great to significantly increase a moving distance of a finger.

Further, a QWERTY keyboard interface is known as an intuitive and rapid interface. However, to implement a QWERTY keyboard on a touchscreen, a user should put fingers in the air unless the user contacts the fingers on the touchscreen for a short time when he is inputting characters. Because of this inconvenience, a user frequently uses a QWERTY keyboard interface using one finger instead of two. However, when a QWERTY keyboard interface is provided at the whole lower end of a large terminal such as a tablet PC, the distance one would have to move his finger becomes quite large.

Moreover, as the world becomes more globalized, one may frequently need to simultaneously input in a plurality of foreign languages, including, for example, the Korean language and other languages. However, it is very inconvenient for a user to change input languages every time.

SUMMARY OF THE INVENTION

The present invention has been made in view of the above problems, and provides an interface that enables a user to conveniently keyboard-input in a terminal having a touchscreen on a large screen.

The present invention further provides an interface that enables a user to efficiently input text composed of various combined languages in a terminal having a touchscreen having a large screen.

In accordance with an aspect of the present invention, a method for providing a character input interface in a terminal having a touchscreen, includes simultaneously providing a first keyboard to a first region of a screen and a second keyboard including second keyboard language selection keys to a second region of the screen by the touchscreen in a character inputting mode; and changing a language of the second keyboard to a language corresponding to a second touched keyboard language selection key touched while maintaining a language of the first keyboard when input touching the second keyboard language key is received.

In accordance with another aspect of the present invention, a terminal for providing a character input interface through a touchscreen including a touch sensor and a display unit, includes the touchscreen simultaneously providing a first keyboard to a first region and a second keyboard including second keyboard language selection keys to a second region by the touchscreen in a character inputting mode; and a controller controlling the touchscreen to change a language of the second keyboard to a language corresponding to a second touched keyboard language selection key touched while maintaining a language of the first keyboard when input touching the second keyboard language key is received by the touchscreen.

In accordance with another aspect of the present invention, a computer-readable recording medium is provided, on which a program for executing the method for providing a character input interface in a terminal having a touchscreen is recorded, including simultaneously providing a first keyboard to a first region of a screen and a second keyboard, including second keyboard language selection keys, to a second region of the screen by the touchscreen in a character inputting mode; and changing a language of the second keyboard to a language corresponding to a second touched keyboard language selection key touched while maintaining a language of the first keyboard when an input is received by touching the second keyboard language key.

BRIEF DESCRIPTION OF THE DRAWINGS

The objects, features, aspects and advantages of the present invention will be more apparent from the following detailed description in conjunction with the accompanying drawings, in which:

FIG. 8A to FIG. 8C illustrate a screen providing a keyboard interface according to an embodiment of the present invention.

DETAILED DESCRIPTION OF EMBODIMENTS OF THE PRESENT INVENTION

A method and an apparatus for providing an interface for inputting a character according to embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

Hereinafter, the present invention is described with reference to drawings for explaining a method and an apparatus for providing a character input interface according to embodiments of the present invention.

As used herein, the term "language of keyboard" or "language of keyboard layout" is not limited to communicative means such as the Korean language, the English language, the Japanese language used in a certain countries. "Numerals, symbols, and functions" with respect to a keyboard interface for certain character input or control such as numerals, symbols, and function keys are regarded as a language of a corresponding key interface. A language of a keyboard represents a representative character or control command capable of being input through a corresponding keyboard. When a language of a keyboard is numerals, the keyboard may include a part of arithmetic symbols such as "+", "−", "/", and "*" or keys for specific characters as well as numeral keys of 0-9. When a language of a keyboard is Korean, the keyboard may include a part of keys of punctuation symbols such as "." and "," as well as Korean letters. That is, the language of the keyboard becomes information capable of identifying the arrangement of keys of a corresponding keyboard.

Figure 1:
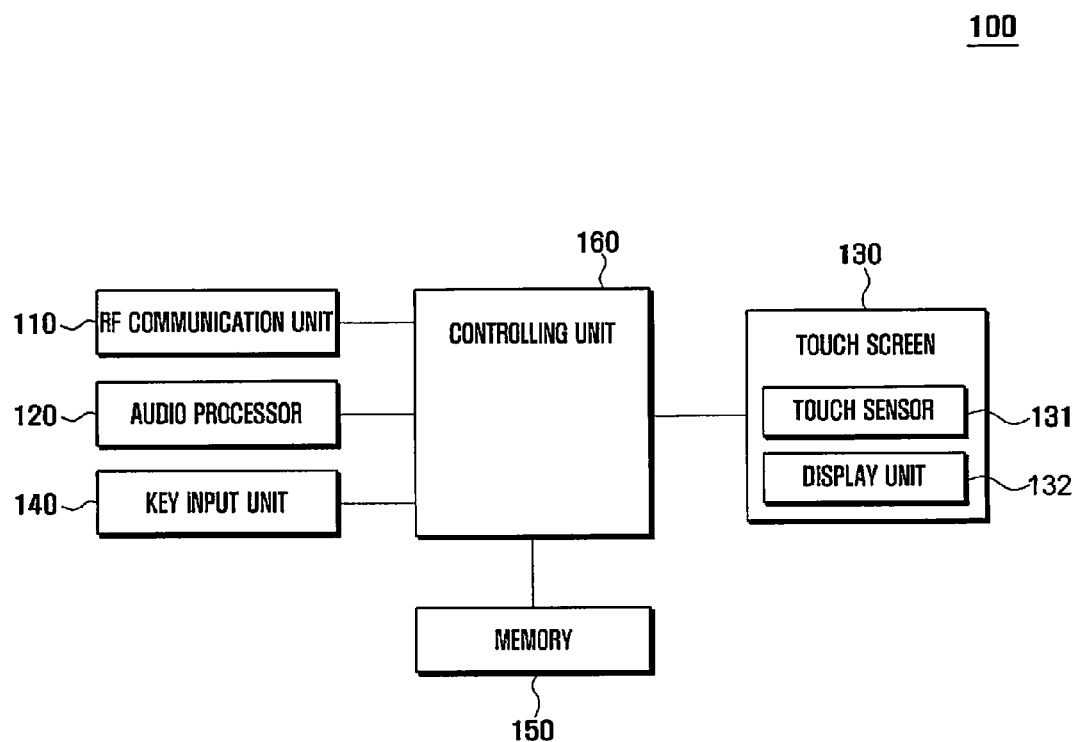
FIG. 1 is a block diagram illustrating a configuration of a terminal according to an embodiment of the present invention.

FIG. 1 is a block diagram illustrating a configuration of a terminal 100 according to an embodiment of the present invention.

Referring to FIG. 1, a terminal 100 of the present invention includes a Radio Frequency (RF) communication unit 110, an audio processor 120, a touchscreen 130, a key input unit 140, a memory 150, and a controller 160.

The RF communication unit 110 performs the transmitting and receiving functions of corresponding data for RF communication of the terminal 100. The RF communication unit 110 includes a transmitter (not shown) for up-converting a frequency of a transmitted signal and amplifying the signal, a receiver (not shown) for low-noise-amplifying a received signal and down-converting the signal. Further, the RF communication unit 110 receives data through an RF channel and outputs the received data to the controller 160. The RF communication unit 110 transmits data output from the controller 160 through the RF channel.

The audio processor 120 may be configured by a COderDECoder (CODEC). The CODEC may include a data CODEC processing packet data and an audio CODE processing an audio signal. The audio processor 120 converts a digital audio signal into an analog audio signal using the audio CODEC, and plays the analog audio signal using a speaker SPK. The audio processor 120 converts an analog audio signal input from a microphone MIC into a digital audio signal using the audio CODEC.

The touchscreen 130 includes a touch sensor 131 and a display unit 132. The touch sensor 131 detects touch input of a user. The touch sensor may be configured by a touch sensor such as a capacitive type, a resistive overlay type, an infrared beam type or a pressure sensor. Aside from the foregoing sensors, various types of sensor device capable of sensing contact or pressure of an object may be configured as the touch sensor 131 of the present invention. The touch sensor 131 detects touch input of a user, generates and transmits a sensing signal to the controller 160. The sensing signal contains coordinate data that a user inputs a touch.

When the user inputs a touch position moving operation, the touch sensor 141 generates and transmits a sensing signal including coordinate data of a touch position moving path to the controller 160.

Specifically, the touch sensor 131 may detect user input for extending and displaying an object item group. The user input may include a touch (including multi-touch) or drag.

The display unit 132 may be a Liquid Crystal Display (LCD), an Organic Light Emitting Diode (OLED), or an Active Matrix Organic Light Emitting Diode (AMOLED). The display unit 132 displays menus of the terminal 100, input data, function setting information, and various other information to a user. The display unit 132 executes a function outputting a boot screen, an idle screen, a menu screen, a call screen, and other application screens of the terminal 100.

The touchscreen 130 of the present invention simultaneously provides a first keyboard and a second keyboard under the control of the controller 160. Here, the first keyboard and the second keyboard may display different languages. Further, if the touchscreen 130 detects language selection input of the second keyboard, only a language of the second keyboard may change in a maintained state of the language of the first keyboard. For example, the first keyboard may show a main language (for example, the Korean language) input keyboard. The second keyboard may be an assistant language (for example, numerals, functions, symbols, Greek language, Chinese language, and the like) input keyboard. The second keyboard may refer to an "assistant keyboard" or a "secondary keyboard" in that it is a keyboard for inputting an assistant language. The second keyboard may refer to "quick keyboard" in that it helps rapid character input. However, the role sharing of the first keyboard and the second keyboard may be substituted for each other or be suitably combined.

A user may input characters using a keyboard provided through the touchscreen 130. Operations of the first keyboard and the second keyboard may, for example, be performed through drag input. An operation of the touchscreen 130 is described with reference to FIG. 2 to FIG. 8C in detail.

The key input 140 receives a key operation of a user for controlling the terminal 100, and generates and transfers an input signal. The key input unit 140 may be configured by a keypad including numeral keys and direction keys, or a predetermined function key provided at one side of the terminal 100. In an embodiment of the present invention, when all operations of the terminal 100 can be performed by only the touchscreen 130, the key input unit 140 may be omitted.

The memory 150 stores programs and data necessary for an operation of the terminal 100. The memory 150 may be divided into a program area and a data area. The program area stores a program controlling an overall operation of the terminal 100, an Operating System (OS) for booting the terminal 100, an application program necessary for playback of multimedia contents, or other option functions of the mobile terminal such as a camera function, a sound playing function, or an image or moving image playing function. The data area stores data created according to use of the terminal 100, for example, images, moving images, phonebooks, and audio data.

The controller 160 controls an overall operation of respective structural elements of the terminal 100. In particular, the controller 160 controls the terminal 100 to simultaneously provide a first keyboard and a second keyboard through the touchscreen 130. An operation of the controller 160 will be illustrated with reference to FIG. 2 to FIG. 8C in detail.

Figure 2:
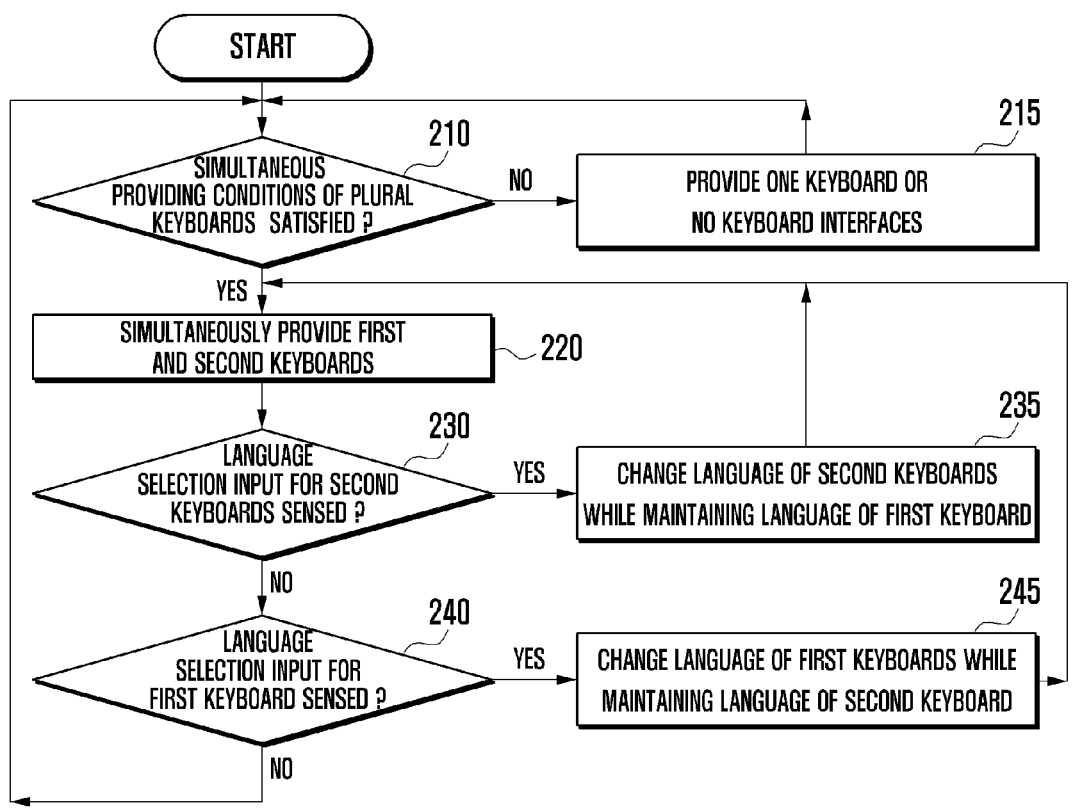
FIG. 2 is a flowchart illustrating a method for providing a character input interface according to an embodiment of the present invention.

FIG. 2 is a flowchart illustrating a method for providing a character input interface according to an embodiment of the present invention.

A controller 160 determines whether conditions for providing plural keyboards simultaneously are satisfied (210). The conditions for providing plural keyboards simultaneously may change according to setting of the terminal 100. For example, when a need of provision of a keyboard is detected, that is, if a user selects conditions for providing plural keyboards simultaneously, the controller 160 may determine that the conditions for providing plural keyboards simultaneously are unconditionally satisfied. In another embodiment, when a direction of the terminal 100 is a landscape mode and a need of provision of a keyboard is detected, the controller 160 determines that the conditions for providing plural keyboards simultaneously are satisfied. When the need of provision of the keyboard is detected, a key of one language is simply provided in a conventional way. However, when a user touches a button requesting provision of plural language keyboards, the controller 160 determines that the conditions for providing plural keyboards simultaneously are satisfied. Further, when the need of provision of a keyboard is detected, only English QWERTY keyboard is simply provided. Next, if a Korean/English selection key is touched, the controller 160 determines that the conditions for providing plural keyboards simultaneously are satisfied. The conditions for providing plural keyboards simultaneously are illustrated by way of example, which can be changed by a user, a hardware producer, or a software developer.

When the conditions for providing plural keyboards simultaneously are not satisfied, the process proceeds to step 215. The touchscreen 130 provides one keyboard, for example, a QWERTY keyboard, or no keyboard interfaces in step 215. The process then returns to step 210 and repeats step 210 and step 215 until the simultaneous providing conditions of the keyboards are satisfied.

When the conditions for providing plural keyboards simultaneously are satisfied, the touchscreen 130 simultaneously provides a first keyboard and a second keyboard in step 220.

Figure 3A:
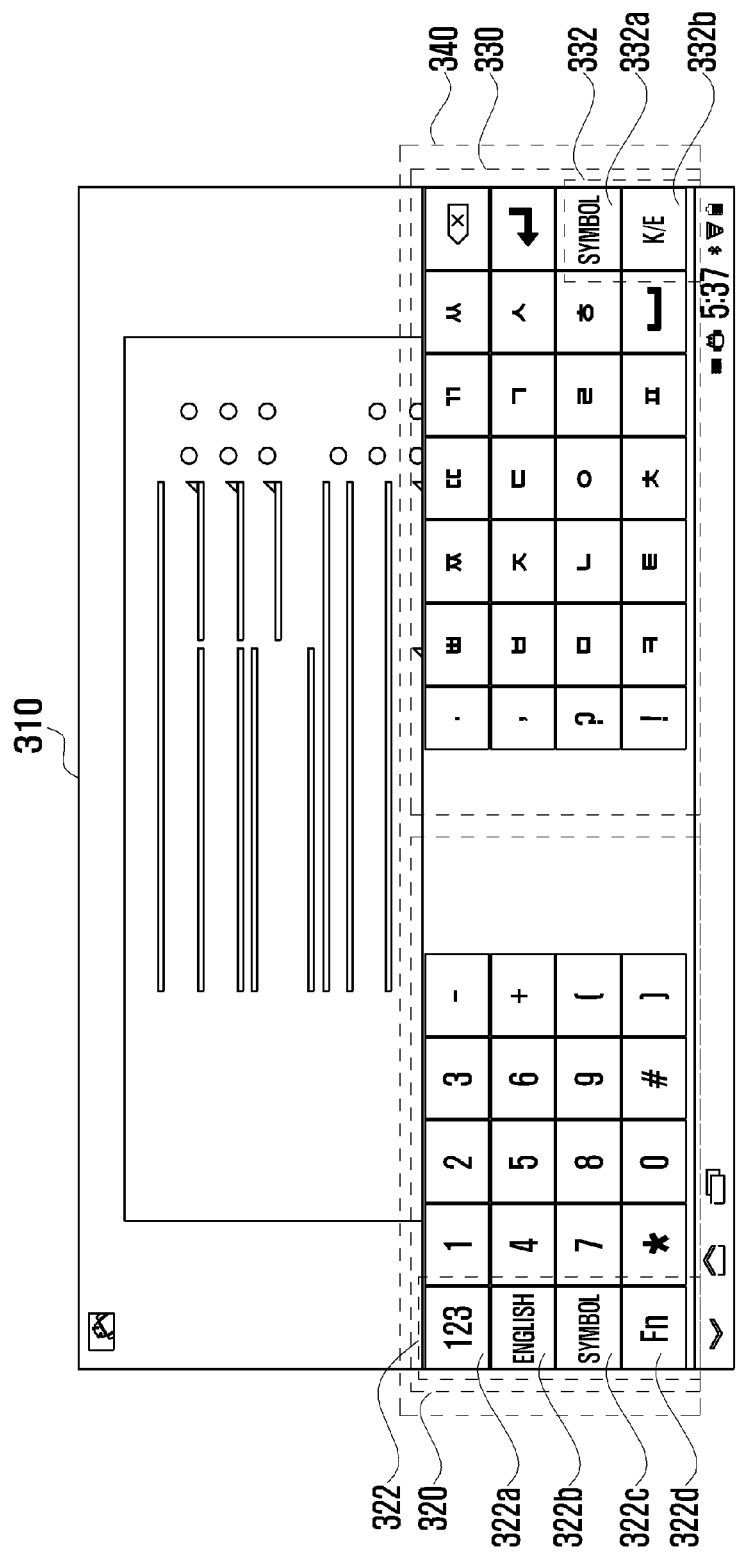
FIG. 3A to FIG. 4 illustrate a screen providing a keyboard interface according to an embodiment of the present invention.
Figure 3B:
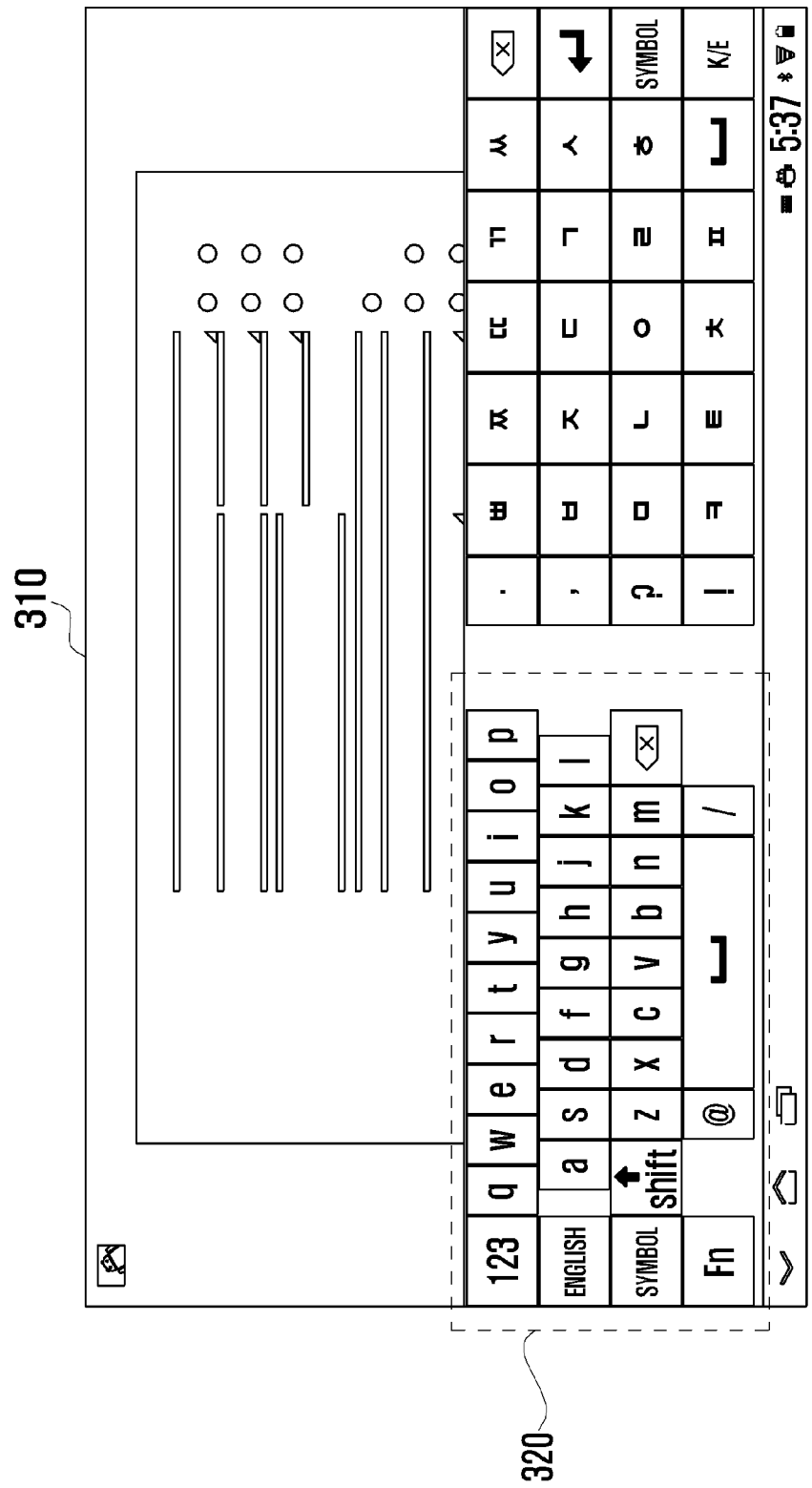
Figure 4:
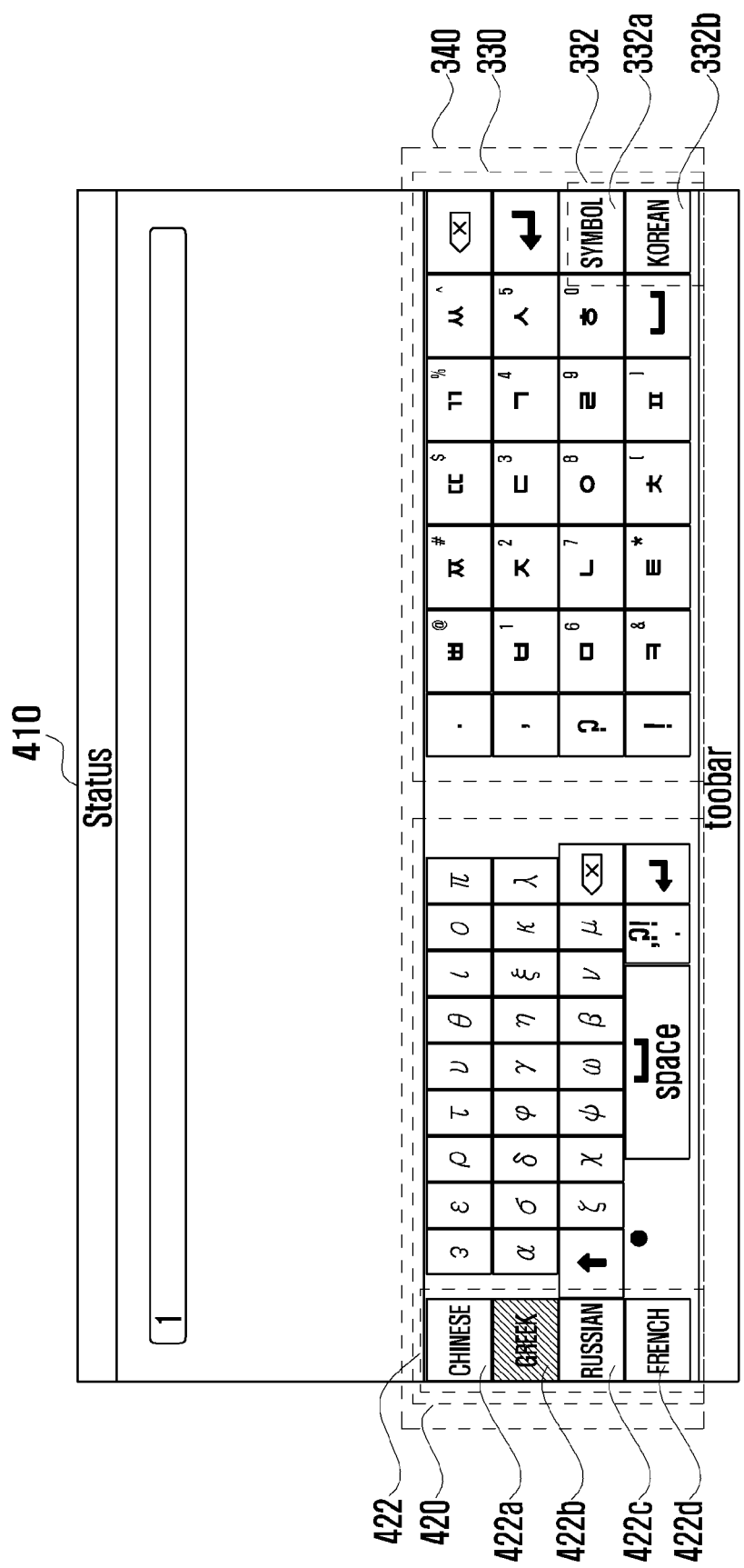

FIG. 3A to FIG. 4 illustrate a screen providing a keyboard interface according to an embodiment of the present invention.

Referring to FIG. 3A, a keyboard interface 340 is provided at a lower part of a screen 310 of a touchscreen. A second keyboard interface 320 ("second keyboard") is provided a left side in the keyboard interface 340. A first keyboard interface 330 ("first keyboard") is provided a right side in the keyboard interface 340. The second keyboard 320 includes second keyboard language selection keys 322, and the first keyboard 330 includes first keyboard language selection keys 332. As shown in FIG. 3A, the Korean language is selected as a language for the first keyboard 330. Numerals are selected as a language of the second keyboard 320. If a user touches one of second key language selection keys 322, a language of the second keyboard 320 is changed. A language of the first keyboard 330 is not changed. If the user touches one of the first keyboard language selection keys 332, the language of the second keyboard 320 stays the same but the language of the first keyboard 330 is changed.

For example, if the user a numeral selection key 322a, the language of the second keyboard 320 becomes numerals. The screen of FIG. 3A shows a screen in which the language of the second keyboard 320 is numerals.

In another embodiment, if a user touches an English selection key 322b, the language of the second keyboard 320 becomes the English language as illustrated in FIG. 3B. If the user touches a symbol selection key 322c, a keyboard for inputting special symbols (such as ', !, @, #, $, %, ˆ, &, *, and the like) is provided as the second keyboard. That is, the language of the second keyboard 320 becomes "symbols". Moreover, if the user touches a function selection key 322d, a keyboard for inputting function keys (such as up, down, left and right motion of cursor, character deletion, and the like) is provided as the second keyboard 320. That is, the language of the second keyboard 320 becomes "functions." As previously illustrated, the language of a keyboard includes a language used for communication in each country and may also include a language including character or control inputs in the case of a keyboard having a plurality of keys for specific character and control inputs.

In an embodiment of FIG. 3A and FIG. 3B, when a user chiefly input the Korean language and uniformly used symbols, an English language, and numerals, the user may conveniently input characters.

As an example of FIG. 4, multiple languages are selected as the language of the second keyboard 420. A keyboard interface 340 is provided at a lower end of a screen 410 in FIG. 4. A first keyboard 330 is disposed at a right side in a keyboard interface 340 as illustrated in FIG. 3A and FIG. 3B. The construction of the first keyboard 330 is identical to that illustrated in FIG. 3A and FIG. 3B, and thus the description thereof is omitted.

A second keyboard 420 is provided to a left side in the keyboard interface 340. The second keyboard 420 includes second keyboard language selection keys 422. The second keyboard language selection keys 422 include the Chinese language selection key 422a, the Greek language selection key 422b, the Russian language selection key 422c, and the French language selection key 422d. FIG. 4 illustrates a keyboard provided when a user touches the Greek language selection key 422b. That is, when the Greek language is selected as the language of the second keyboard 420, a keyboard of FIG. 4 is provided. When the user touches the Chinese language selection key 422a, the Greek language selection key 422b, the Russian language selection key 422c, or the French language selection key 422d, the controller 160 may change the language of the second keyboard 420 to a language corresponding to the selection keys 422a, 422c, and 422d without changing the language of the first keyboard 330.

In an embodiment of FIG. 4, when the user uniformly inputs Chinese languages, Greek language, Russian language, and French language while chiefly inputting characters in the Korean language, the user is able to more conveniently input characters.

Referring back to FIG. 2, the controller 160 determines whether language selection input for second keyboard 320 or 420 is detected through a touchscreen 130 in step 230. The language selection input for the second keyboards 320 or 420 may be touch input of a second keyboard language selection key 322 of FIG. 3A and touch input of a second keyboard language selection key 422 of FIG. 4. When the language selection input for the second keyboard 320 or 420 is detected, the controller 160 changes a language of the second keyboard 320 or 420 to a selected language while maintaining a language of the first keyboard 330 in step 235. When the language selection input for the second keyboards 320 or 420 is not detected, the process proceeds to step 240.

The controller 160 determines whether language selection input for a first keyboard 330 is detected through the touchscreen 130 in step 240. The language selection input for the first keyboard 330 may be touch input of a first keyboard language selection key 332. When the language selection input for the first keyboard 330 is detected, the controller 160 changes a language of the first keyboard 330 to a selected language while maintaining a language of second keyboard 320 or 420 in step 245. When the language selection input for the first keyboard 330 is not detected, the process returns to step 210 and repeats steps 210 to 240 until conditions for providing plural keyboards simultaneously are satisfied.

Figure 5A:
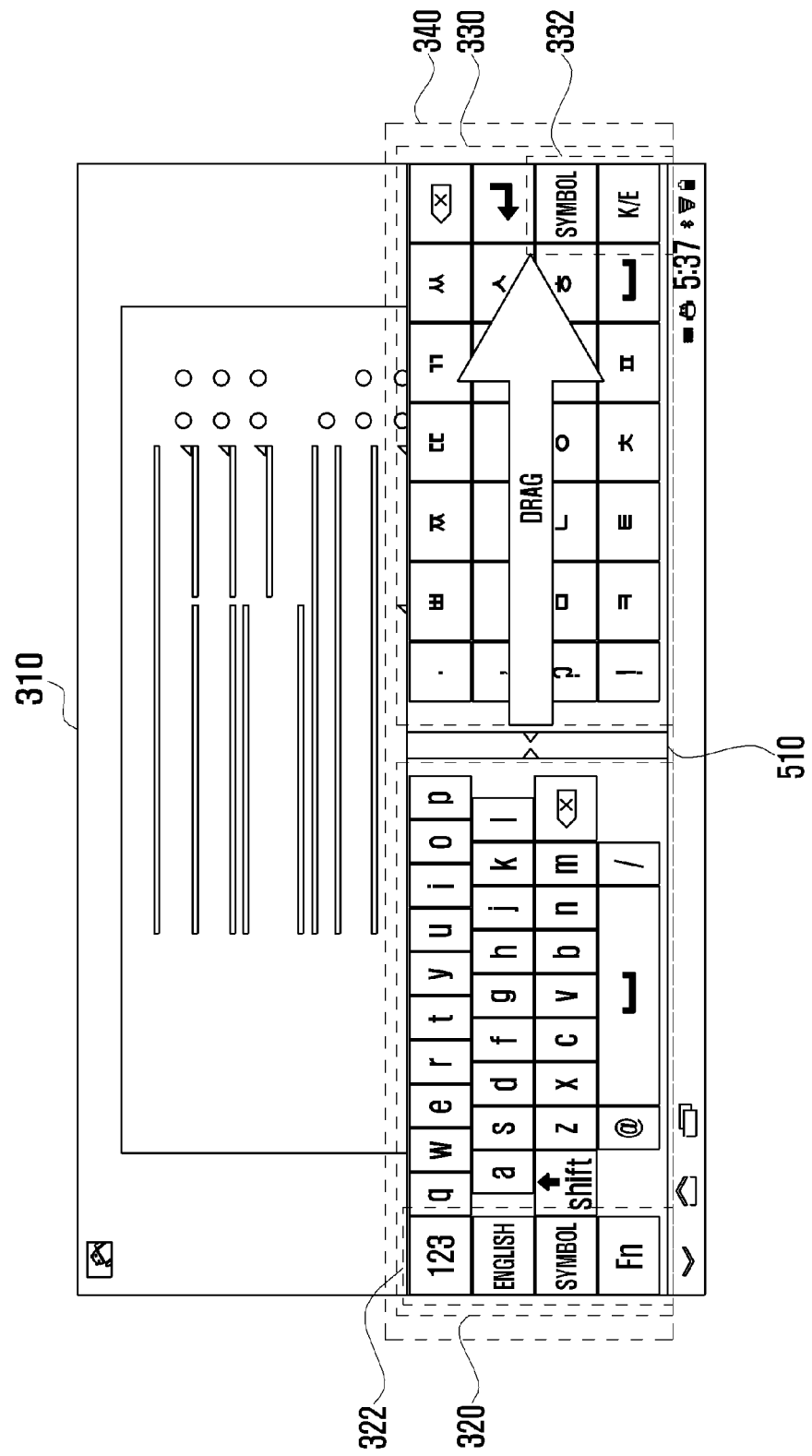
FIG. 5A and FIG. 5B illustrate a screen of a touchscreen according to an embodiment of the present invention.
Figure 5B:
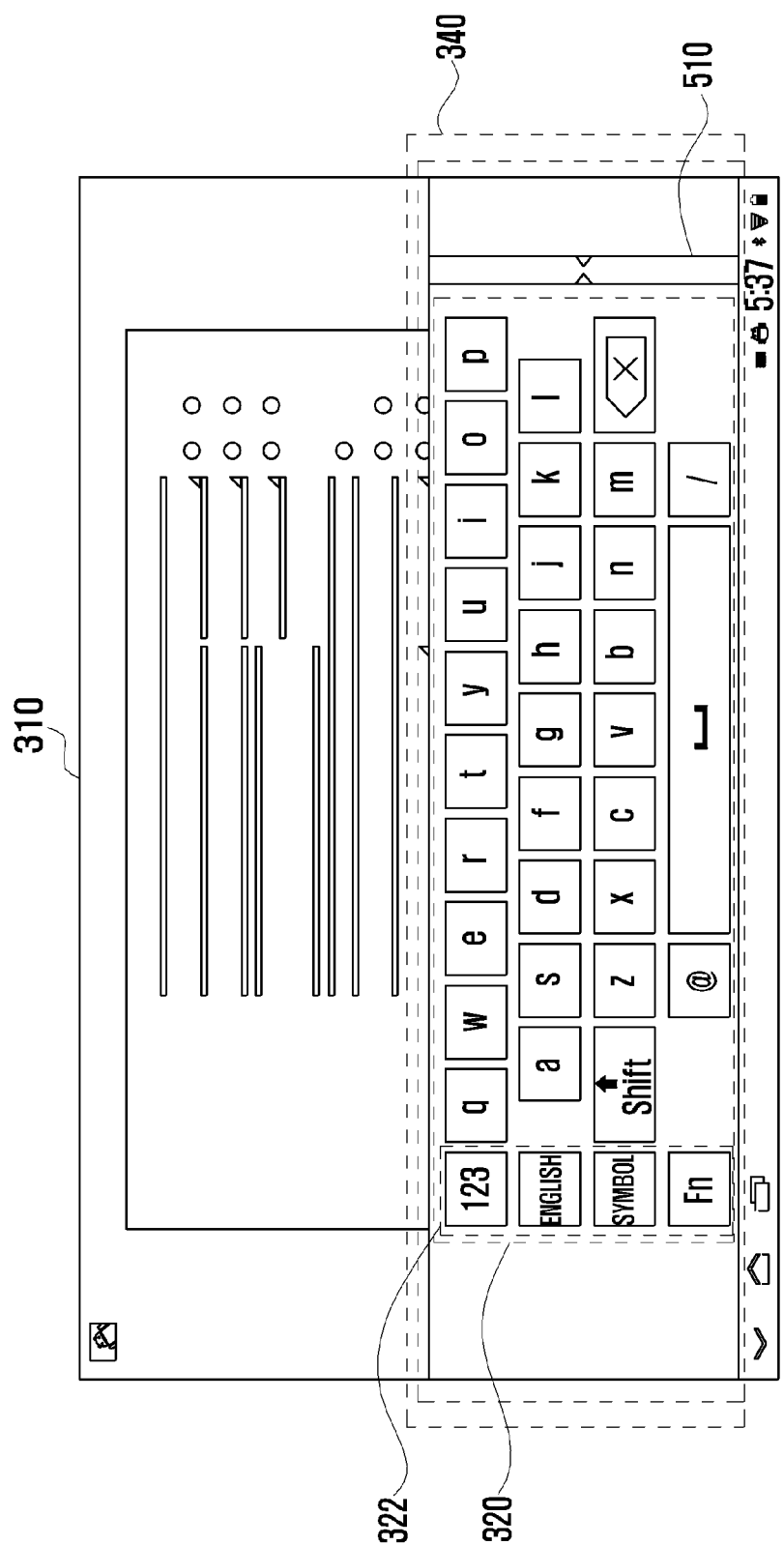

FIG. 5A and FIG. 5B illustrate a screen of a touchscreen 130 according to an embodiment of the present invention. In FIG. 5A, a boundary 510 is shown between the first keyboard 330 and the second keyboard 320. If a user drags the boundary 510 toward one of a left side or a right side by greater than a preset distance, the controller 160 may cause the touchscreen 130 to display only one of the first keyboard 330 and the second keyboard 320 on most regions of the keyboard 340 but not to display a remaining one thereof.

For example, when a user drags the boundary 510 to the left end of the first keyboard 330 as illustrated in FIG. 5A, the controller 160 stops displaying the first keyboard 330 as shown in FIG. 5B, and controls the second keyboard 320 to be enlarged and displayed over a larger region of the keyboard 340. The boundary 510 is moved to a right lower end of the screen 310 to be displayed. In a screen of FIG. 5B, when a user drags the boundary 510 to a lower center end of the screen 310, two keyboards may be simultaneously provided like a screen of FIG. 5A.

In an embodiment shown on FIG. 5A and FIG. 5B, a user may conveniently enlarge a keyboard to use a keyboard interface to distinguish between a case where one keyboard is used from a case where at least two keyboards are used.

Figure 6A:
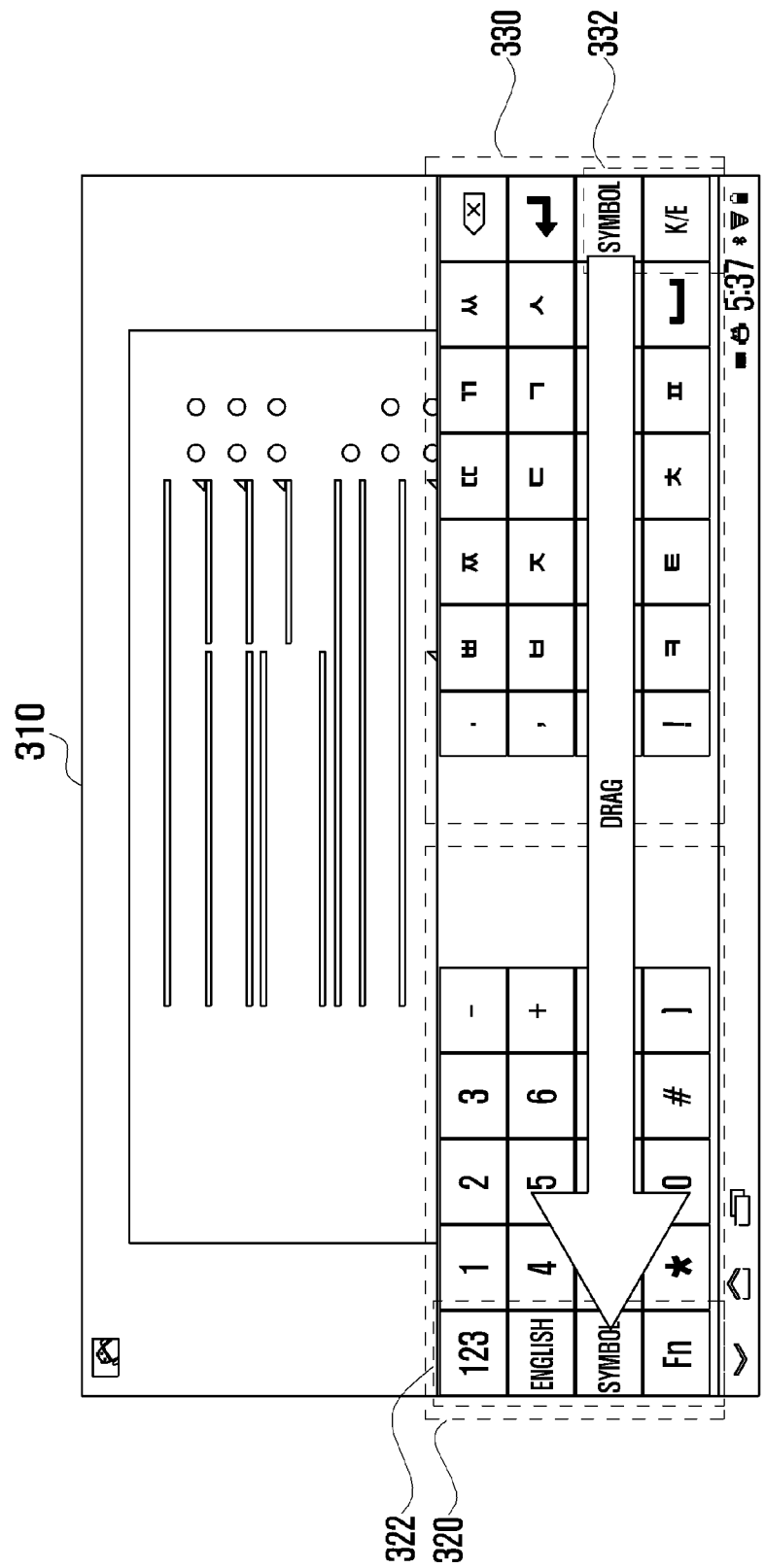
FIG. 6A and FIG. 6B illustrate a screen of a touchscreen according to an embodiment of the present invention.
Figure 6B:
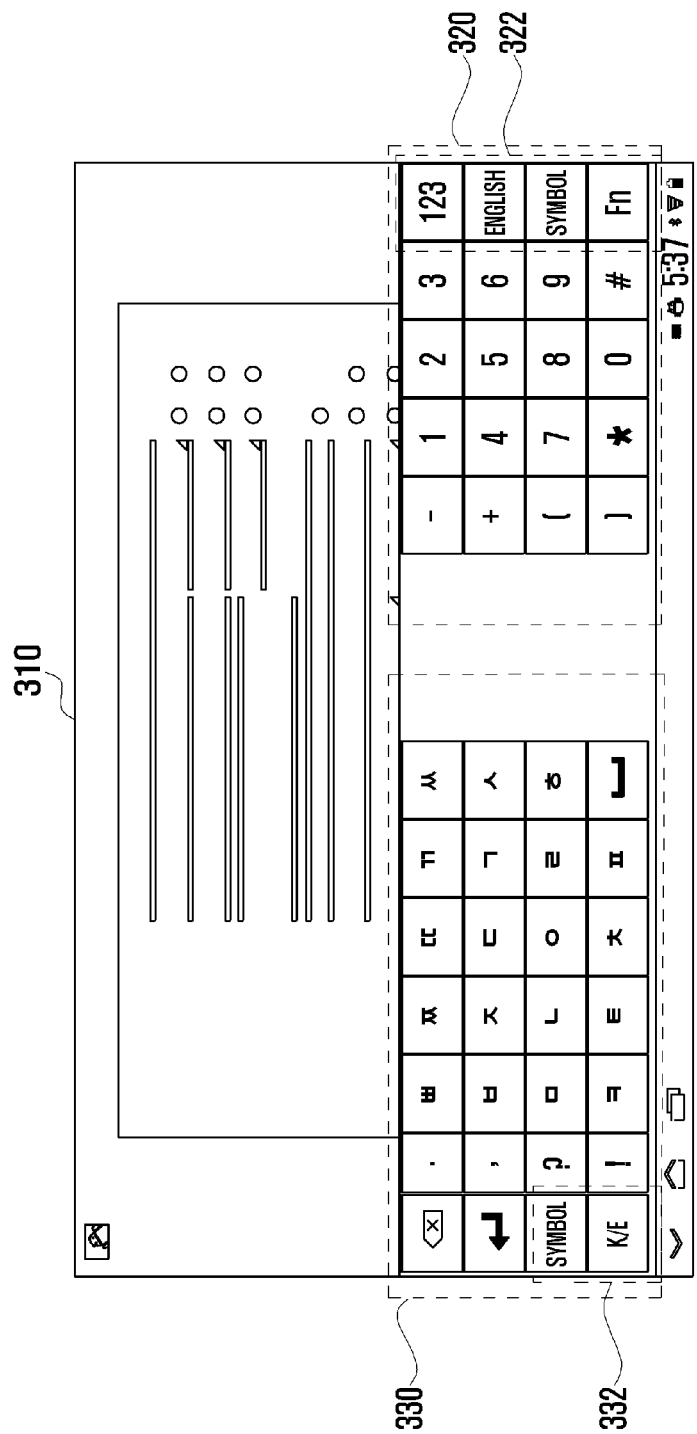

FIG. 6A and FIG. 6B illustrate a screen of a touchscreen 130 according to an embodiment of the present invention.

As shown in FIG. 6A, a first keyboard 330 is displayed on a lower right portion of a screen 310, and a second keyboard 320 is displayed on a lower left portion of the screen 310. If the touchscreen 130 detects a drag input from a preset position in the first keyboard 330 to a preset position in the second keyboard 320, the controller 160 controls the touchscreen 130 to switch the positions of the first keyboard 330 and the second keyboard 320 to each other. In the same manner, if the touchscreen 130 detects drag input from a preset position in the second keyboard 320 to a preset position in the first keyboard 320, the controller 160 may cause the touchscreen 130 to switch the positions of the first keyboard 330 and the second keyboard 320 to each other.

For example, as shown in FIG. 6A, when a user drags a language selection key 332 of the first keyboard 330 to a language selection key 322 of the second keyboard 320, the touchscreen 130 may switch the positions of the first keyboard 330 and the second keyboard 320 to each other. FIG. 6B is an example in which the positions of the first keyboard 330 and the second keyboard 320 are switched. However, when positions of the first keyboard 330 and the second keyboard 320 are switched, positions of language selection keys 332 and 322 may be disposed at lower left or right end of a screen 310 for convenience for a user. A modified embodiment is possible in which the language selection keys 332 and 322 are located at a center of a screen while maintaining a whole form of the first keyboard 330 and the second keyboard 320.

Because right-handers are more than left-handers, a first keyboard 300 inputting a main language is located at a right side. However, a left-handed user may wish to locate the first keyboard 330 at a left side. Further, when a right-handed user inputs a language of the second keyboard 320 temporarily and chiefly, the user may wish to locate the second keyboard 320 at a right side.

Instead of the foregoing drag input, through another touch input, keypad input, or setting of a terminal, positions of the first keyboard 330 and the second keyboard 320 may be switched with each other.

In a modified embodiment, when recognizing drag input by greater than a preset distance in a preset direction, the touchscreen 130 may switch the positions of the first key 330 and the second keys 320 with each other. For example, when the touchscreen 130 receives drag input having the length greater than 5 centimeters (cm) and orienting from a right side to a left side, it may recognize the drag input as keyboard position change input requesting positions of the first keyboard 330 and the second keyboard 320 to be switch with each other. It may be changed according to the setting of a software provider, a hardware producer, or a user if input of a direction or a length is recognized as position change input of a keyboard.

A direction of drag input is an approximate input direction. Substantially, when a complete drag input trajectory has a constant orientation, a direction corresponding to the orientation may be a direction of the drag input. That is, when coordinate movement to a vertical direction is 3 millimeters (mm) and coordinate movement to a horizontal direction is 5 cm in drag input, the coordinate movement to a vertical direction may be disregarded. Thus, a direction of the drag input is a left direction.

Meanwhile, the first keyboard and the second keyboard may be shown at an upper end, a left side, or a right side of the screen 310 according to setting. In the same manner, the user may switch the positions of the first keyboard 330 and the second keyboard 320 with each other.

The user may conveniently switch the positions of the keyboards according to an embodiment of FIG. 6A and FIG. 6B.

Figure 7A:
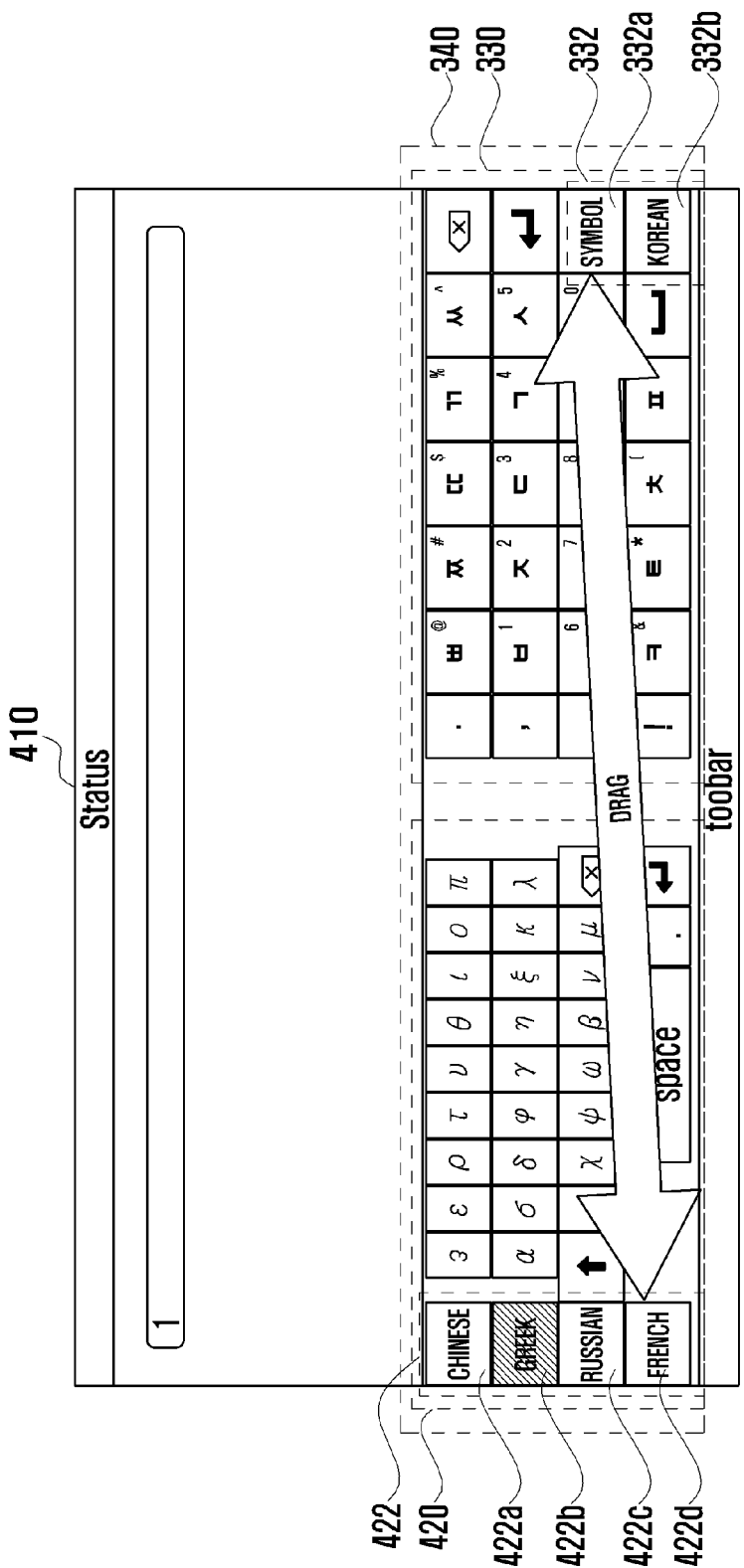
FIG. 7A and FIG. 7B illustrate a screen providing a keyboard interface according to an embodiment of the present invention.
Figure 7B:
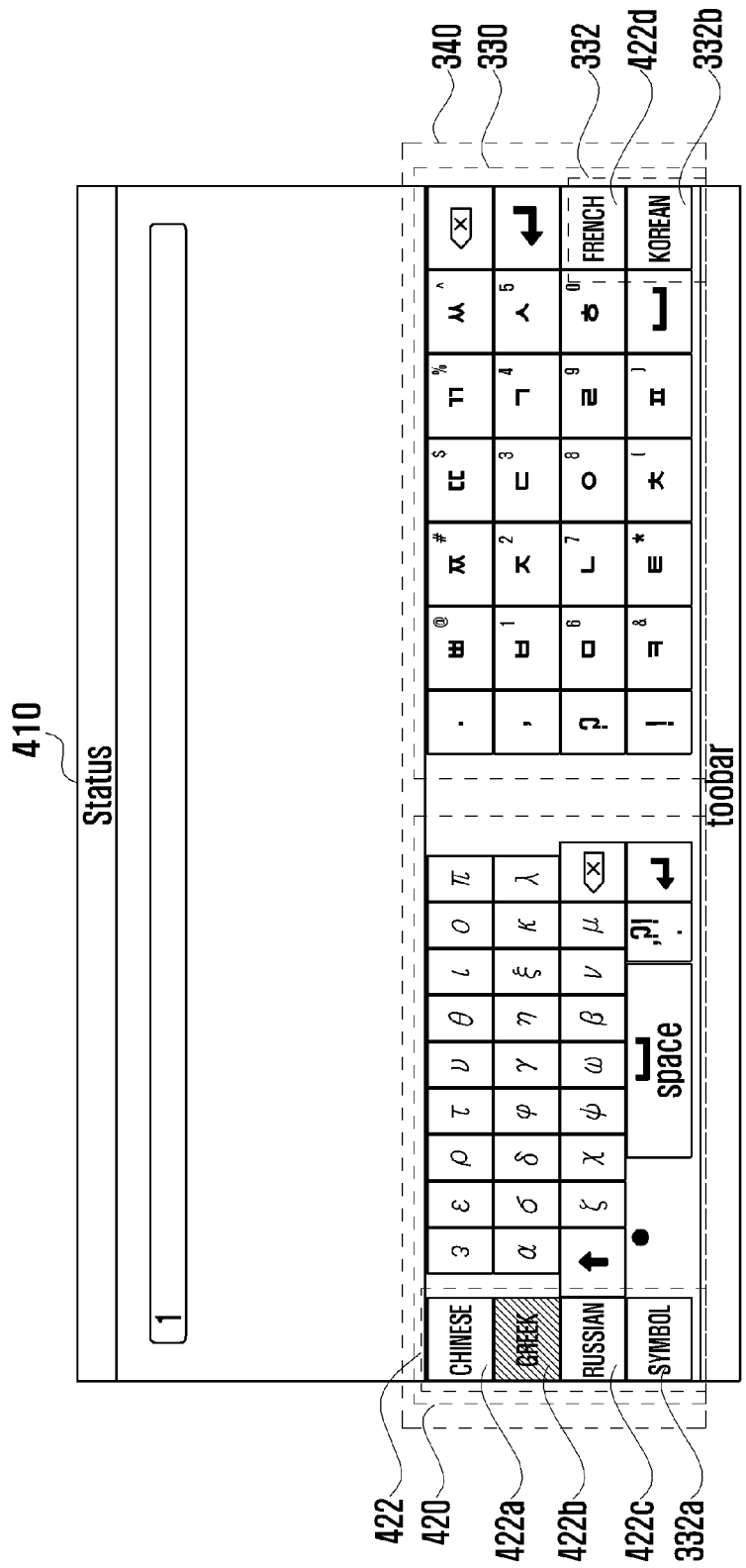

FIG. 7A and FIG. 7B illustrate a screen providing a keyboard interface according to an embodiment of the present invention.

A user may drag a symbol selection key 332a to a position of a French language selection key 422d on a screen of FIG. 7A. If the touchscreen 130 detects the drag input, a controller 160 switches the positions of the symbol selection key 332a and the French language selection key 422d with each other. When the symbol selection key 332a and the French language selection key 422d are switched with each other, a screen of FIG. 7A is changed to a screen of FIG. 7B. Then, if the user touches the French language selection key 422d on the screen of FIG. 7B, the controller 160 changes a language of the first keyboard 330 to a French language. In the same manner, if the user selects a symbol selection key 322a on a screen of FIG. 7B, the controller 160 changes the language of the second keyboard 420 to symbols. That is, through the foregoing drag input, the symbol selection key 332a becomes a key selecting the language of the second keyboard 420, and a French language selection key 422d becomes a key selecting the language of the first keyboard 330. The foregoing operation may be performed in the same manner when the French language selection key 422d is dragged to a position of a symbol selection key 332a.

In an embodiment of FIG. 7A and FIG. 7B, the user may change languages freely and conveniently that is applicable to the first keyboard 330 and the second keyboard 420.

Figure 8A:
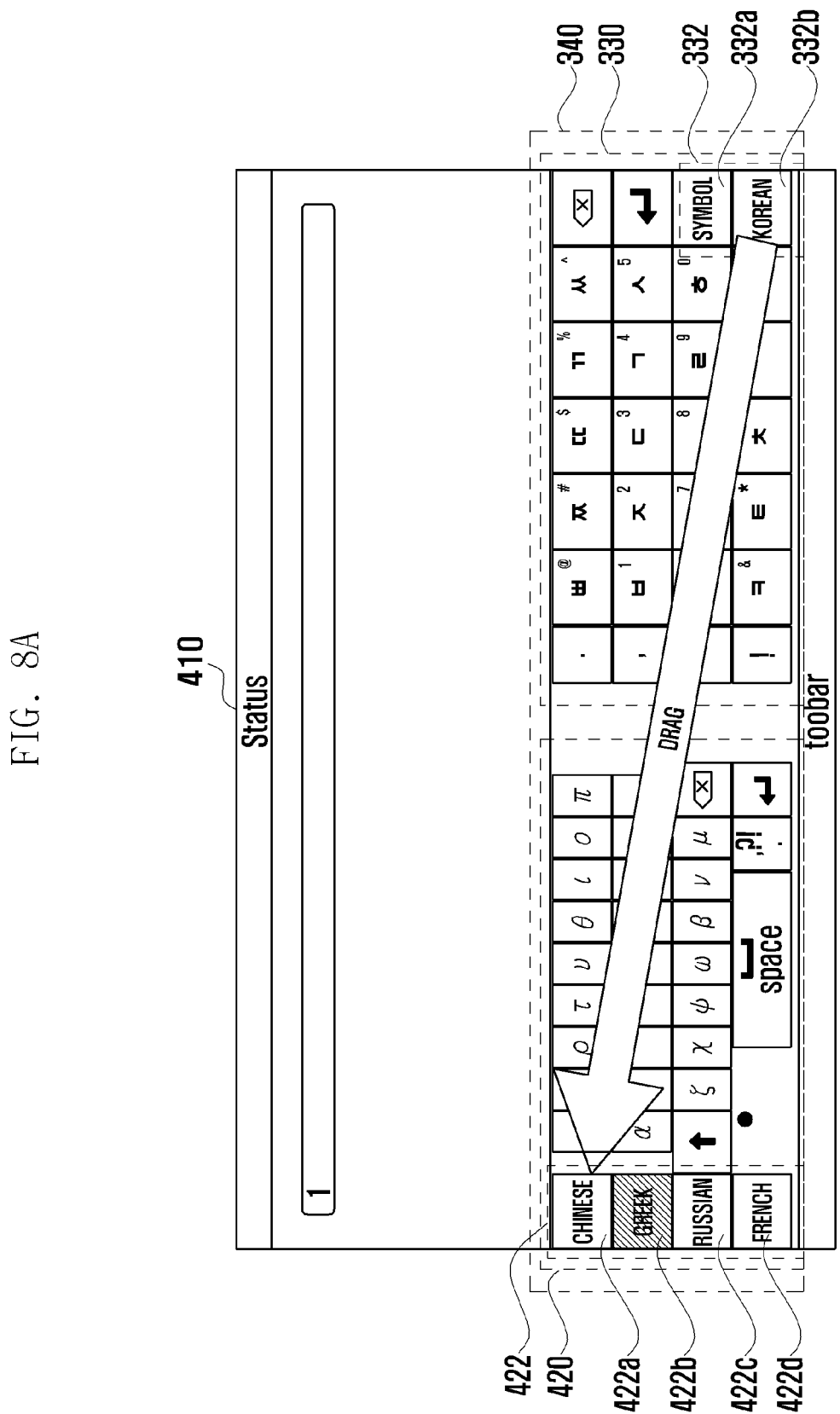
Figure 8B:
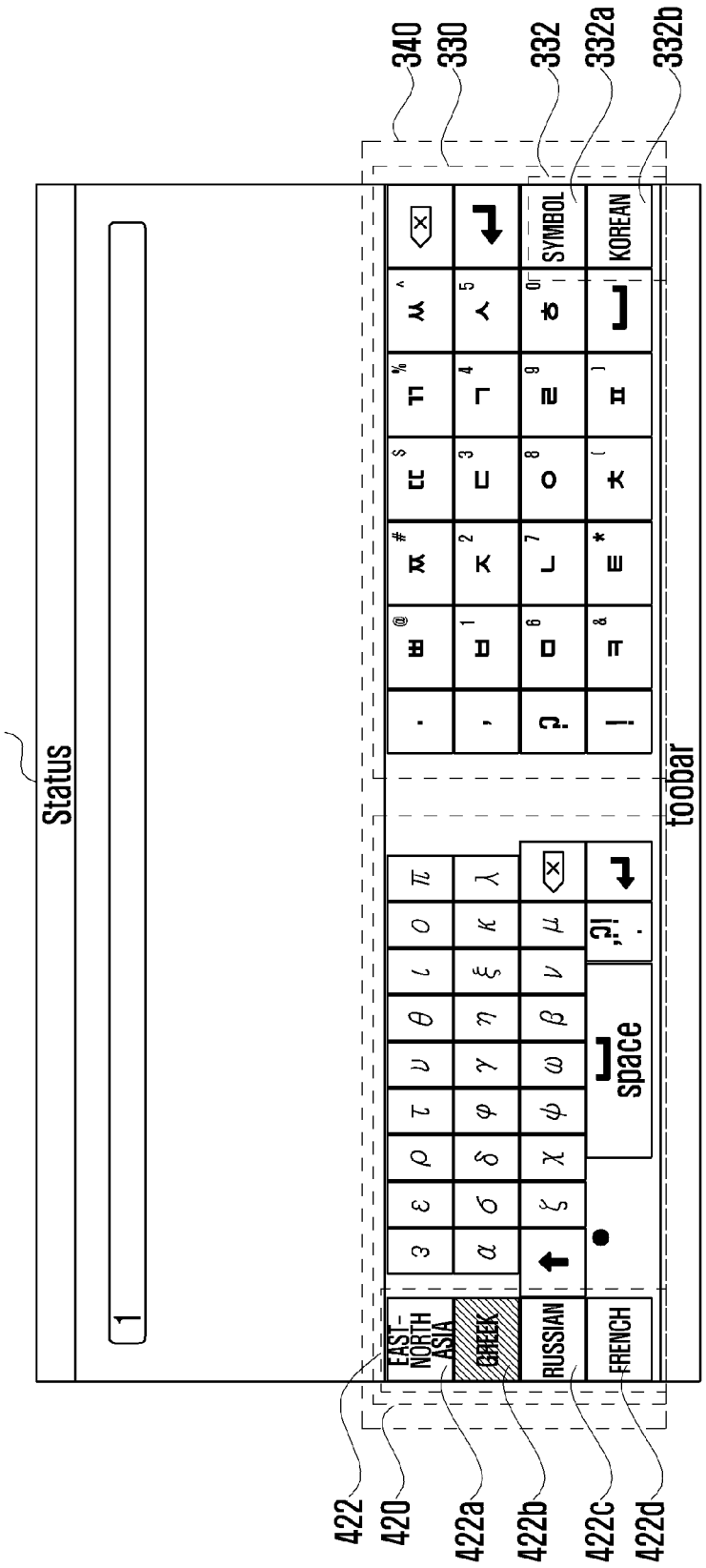

FIG. 8A to FIG. 8C illustrate a screen providing a keyboard interface according to an embodiment of the present invention. A user drags a Korean language selection key 332b to a position of a Chinese selection key 422a. Then, an "Northeast Asia" selection key 422a is displayed at a position of a Chinese selection key 422a of FIG. 8A like a screen of FIG. 8B. A text to be displayed at a position of a key 422a may be input by a user or automatically selected by a system. In the foregoing embodiment, since both the Korean language and the Chinese language are an Northeast Asia, "Northeast" representing it is displayed at a position of a key 422a.

Next, if a user touches an "Northeast Asia" selection key 422a, a pop-up interface 810 is provided as illustrated in FIG. 8C. In this case, the pop-up interface 810 includes a Chinese selection key 810b corresponding to a Chinese selection key existing at a position of a corresponding key 422a and a Korean language selection key 810a dragged to the position of the corresponding key 422a. If the user selects a Korean language selection key 810a or a Chinese selection key 810b, a language of the second keyboard 420 becomes the Korean language or the Chinese language. That is, if a certain key (i.e., first key) is dragged to a position of another key (i.e., second key), a category display button combining a language of the first key with a language of the second key is provided to a position of the second key. If the user touches a corresponding category display button, a pop-up interface capable of selecting one of the first key language or the second key language or a selection interface of another scheme is provided.

This embodiment illustrates that a language selection key 332 of the first keyboard 330 is dragged as a language selection key 422 of the second keyboard 420. In another embodiment, when one of language selection keys 332 of the first keyboard 330 is dragged to a position of another language selection key or a language selection keys 422 of the second keyboard 420 is dragged to a position of another language selection keys 442, the keyboard interface may be provides as described above. Further, when one of the language selection eyes of the second keyboard 200 is dragged to a position of one of the first keyboard 330, the same operation is performed.

In an embodiment of FIG. 6 to FIG. 8A, a user may more efficiently use a limited language selection key space to conveniently input more languages.

In an embodiment illustrated in FIG. 8A to FIG. 8C, simple drag input is used as input for creating a category. However, this may cause a problem since it may unclear whether the embodiment illustrated in FIG. 7A and FIG. 7B is used or FIG. 6A and FIG. 6B. In a modified embodiment, to solve such a problem, input dragging a touch contact point to a position of a Chinese selection key 422a after the touch contact point maintains in a state that a Korean language selection key 332b is touched for a time longer than a preset time may be interpreted as input for creating a category. For example, the preset time may be one second.

For example, if a user drags a Korean language selection key 332b to a position of a Chinese selection key 422a by a drag input, language select keys may be switched with each other in the embodiment of FIG. 7A and FIG. 7B. However, if a user maintains a touch for a Korean language selection key 332b (long key) for a time greater than one second and then drags the Korean language selection key 332b to a position of the Chinese selection key 422a, a language selection key may be categorized according to the embodiment of FIG. 8A to FIG. 8C.

Furthermore, respective initial touch times may set with respect to keyboard position change input for the embodiment of FIG. 6A and FIG. 6B, language selection key switch input for the embodiment of FIG. 7A and FIG. 7B, and language selection key categorizing input for the embodiment of FIG. 8A to FIG. 8C. Here, the initial touch time refers to a time maintaining a certain point or a touch point in a touched state of a certain key. For example, if the initial touch time is less than one second, drag input after an initial touch may be interpreted as touch position change input. If the initial touch time is in the range of 1 second to two seconds, drag input after an initial touch may be interpreted as language selection key switch input. If the initial touch time is greater than two seconds, drag input after an initial touch may be interpreted as language selection key categorizing input. According to the setting approach, the user may adjust the initial touch time to control various keyboards.

It will be appreciated that respective blocks of processing flowchart of FIG. 2 and a combination thereof may be performed by computer program instructions. Since computer program instructions may be executed by a processor of a universal computer, a special computer or other programmable data processing equipment, instructions performed through a processor of a computer or other programmable data processing equipment generates means for performing functions described in block(s) of the flowchart. Since the computer program instructions may be stored in a computer available or computer readable memory capable of orienting a computer or other programmable data processing equipment to implement functions in a specific scheme, apparatuses involving an instruction means executing functions described in block(s) of flowchart may be produced. Because the computer program instructions may be mounted on a computer or other programmable data processing equipment, a series of operation steps are performed in the computer or other programmable data processing equipment to create a process executed by the computer such that instructions performing the computer or other programmable data processing equipment may provide steps for executing functions described in block(s) of flowchart.

Further, each block may indicate a part of a module, a segment, or a code including at least one executable instruction for executing specific logical function(s). It should be recognized that several execution examples may generate functions described in blocks out of an order. For example, two continuously shown blocks may be simultaneously performed, and the blocks may be performed in a converse order according to corresponding functions.

As used in this embodiment, the term unit" (such as key input unit 140 of FIG. 1) refers to software or a hardware structural element such as Field-programmable Gate Array (FPGA) or Application-Specific Integrated Circuit (ASIC), and the unit" perform some roles. However, the "unit" is not limited to software or hardware. The "unit" can be configured to be stored in an addressable storage medium and to play at least one processor. Accordingly, for example, the "unit" includes software structural elements, object-oriented software structural elements, class structural elements, task structural elements, processes, functions, attributes, procedures, subroutines, segments of a program code, drivers, firmware, microcode, circuit, data, database, data structures, tables, arrays, and variables. Functions provided in structural elements and "units" may be engaged by the smaller number of structural elements and "units", or may be divided by additional structural elements and "units". Furthermore, structural elements and "~ units" may be implemented to play a device or at least one CPU in a security multimedia card.

Although embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims and their equivalents.

What is claimed is:

1. A method for providing a character input interface in an electronic device having a touchscreen, the method comprising:
displaying, on the touchscreen, a first keyboard interface including a single keyboard for inputting characters;
based at least on identifying, while displaying the first keyboard interface, that the electronic device is in a landscape mode, displaying together a character input area and a second keyboard interface on the touchscreen, wherein the second keyboard interface includes a first keyboard and a second keyboard, wherein the first keyboard and the second keyboard comprise a first type of character keys and a second type of character keys, respectively, and wherein the second keyboard further comprises a plurality of character-type selection keys comprising a language selection key for selecting a type of character keys for a spoken language;
based on receiving, through the touchscreen, a user touch input for one of the plurality of character-type selection keys of the second keyboard while displaying the first type of character keys and the second type of character keys, replacing the second type of character keys of the second keyboard with a third type of character keys while displaying the first type of character keys of the first keyboard; and
displaying a plurality of characters in the character input area, wherein one character of the plurality of characters is inputted with a character key of the first type of character keys and another of the plurality of characters is inputted with a character key of the third type of character keys,
wherein the first type of character keys is for a first spoken language and the second type of character keys is for a second spoken language, and
wherein the first spoken language is different from the second spoken language.

2. The method of claim 1, wherein the plurality of character-type selection keys are maintained after replacing the second type of character keys of the second keyboard with the third type of character keys.

3. The method of claim 1, wherein an area for displaying the second type of character keys is different from an area for displaying the third type of character keys.

4. The method of claim 1, wherein the first keyboard and the second keyboard are disposed side-by-side and are oriented in a same direction.

5. The method of claim 1, further comprising:
displaying characters in the character input area,
wherein the characters are inputted with at least one character key of the first type of character keys and at least one character key of the second type of character keys.

6. The method of claim 1, further comprising changing a location of at least one of the first keyboard and the second keyboard, based on a touch and move input received through the touchscreen.

7. The method of claim 1, further comprising displaying, on the touchscreen, the first keyboard with a size changed based on another touch and move input received through the touchscreen.

8. The method of claim 1, wherein the displaying together the character input area and the second keyboard interface comprises automatically displaying together the character input area and the second keyboard interface.

9. An electronic device for providing a character input interface, the electronic device comprising:
a memory storing instructions; and
a processor configured to execute the stored instructions to at least control to:
display, on a touchscreen of the electronic device, a first keyboard interface including a single keyboard for inputting characters,
based at least on identifying, while displaying the first keyboard interface, that the electronic device is in the landscape mode, display together a character input area and a keyboard interface on the touchscreen, wherein the second keyboard interface includes a first keyboard and a second keyboard,
wherein the first keyboard and the second keyboard comprise a first type of character keys and a second type of character keys, respectively, and wherein the second keyboard further comprises a plurality of character-type selection keys comprising a language selection key for selecting a type of character keys for a spoken language,
based on receiving, through the touchscreen, a user touch input for one of the plurality of character-type selection keys of the second keyboard while displaying the first type of character keys and the second type of character keys, replace the second type of character keys of the second keyboard with a third type of character keys while displaying the first type of character keys of the first keyboard, and
display a plurality of characters in the character input area, wherein one character of the plurality of characters is inputted with a character key of the first type of character keys and another of the plurality of characters is inputted with a character key of the third type of character keys,
wherein the first type of character keys is for a first spoken language and the second type of character keys is for a second spoken language, and
wherein the first spoken language is different from the second spoken language.

10. The electronic device of claim 9, wherein the processor is configured to execute the stored instructions further to control to maintain the plurality of character-type selection keys after replacing the second type of character keys of the second keyboard with the third type of character keys.

11. The electronic device of claim 9, wherein an area for displaying the second type of character keys is different from an area for displaying the third type of character keys.

12. The electronic device of claim 9, wherein the first keyboard and the second keyboard are disposed side-by-side and are oriented in a same direction.

13. The electronic device of claim 9,
wherein the processor is configured to execute the stored instructions further to control to display characters in the character input area displayed on the touchscreen, and
wherein the characters are inputted with at least one character key of the first type of character keys and at least one character key of the second type of character keys.

14. The electronic device of claim 9, the processor is configured to execute the stored instructions further to control to change a location of at least one of the first keyboard and the second keyboard based on a touch and move input in received through the touchscreen.

15. The electronic device of claim 9, wherein the processor is configured to execute the stored instructions further to control to display, on the touchscreen, the first keyboard with a size changed based on another touch and move input received through the touchscreen.

16. The electronic device of claim 9, wherein the processor is configured to execute the stored instructions to control to display together the character input area and the second keyboard interface by controlling to automatically display together the character input area and the second keyboard interface.

17. A non-transitory computer-readable storage medium with instructions stored thereon, the instructions executable by a processor of an electronic device having a touchscreen to cause the processor to perform operations comprising:
displaying, on the touchscreen, a first keyboard interface including a single keyboard for inputting characters;
based at least on identifying, while displaying the first keyboard interface, that the electronic device is in the landscape mode, displaying together a character input area and a second keyboard interface including on the touchscreen, wherein the second keyboard interface includes a first keyboard and a second keyboard, wherein the first keyboard and the second keyboard comprise a first type of character keys and a second type of character keys, respectively, and wherein the second keyboard further comprises a plurality of character-type selection keys comprising a language selection key for selecting a type of character keys for a spoken language;
based on receiving, through the touchscreen, a user touch input for one of the plurality of character-type selection keys of the second keyboard while displaying the first type of character keys and the second type of character keys, replacing the second type of character keys of the second keyboard with a third type of character keys while displaying the first type of character keys of the first keyboard; and
displaying a plurality of characters in the character input area, wherein one character of the plurality of characters is inputted with a character key of the first type of character keys and another of the plurality of characters is inputted with a character key of the third type of character keys,
wherein the first type of character keys is for a first spoken language and the second type of character keys is for a second spoken language, and
wherein the first spoken language is different from the second spoken language.

18. The non-transitory computer-readable storage medium of claim 17, wherein the plurality of character-type selection keys are maintained after replacing the second type of character keys of the second keyboard with the third type of character keys.

19. The non-transitory computer-readable storage medium of claim 17, wherein an area for displaying the second type of character keys is different from an area for displaying third type of character keys.

20. The non-transitory computer readable storage medium of claim 17, wherein the first keyboard and the second keyboard are disposed side-by-side and are oriented in a same direction.

21. The non-transitory computer-readable storage medium of claim 17,
wherein the operations further comprise displaying characters in the character input area, and
wherein the characters are inputted with at least one character key of the first type of character keys and at least one character key of the second type of character keys.

22. The non-transitory computer-readable storage medium of claim 17, wherein a location of at least one of the first keyboard and the second keyboard is changed based on a touch and move input received through the touchscreen.

23. The non-transitory computer-readable storage medium of clam 17,
wherein the operations further comprise displaying, on the touchscreen, the first keyboard with a size changed based on another touch and move input received through the touchscreen.

24. The non-transitory computer-readable storage medium of claim 17, wherein the displaying together the character input area and the second keyboard interface comprises automatically displaying together the character input area and the second keyboard interface.

25. A method for providing a character input interface in an electronic device having a touchscreen, the method comprising:
controlling to display, on the touchscreen, a first keyboard interface including a single keyboard for inputting characters;
based at least on identifying, while displaying the first keyboard interface, that the electronic device is in the landscape mode, controlling to display together a character input area and a second keyboard interface on the touchscreen, wherein the second keyboard interface comprises a first keyboard and a second keyboard, wherein the first keyboard and the second keyboard comprise a first type of character keys and a second type of character keys, respectively, and wherein the second keyboard further comprises a plurality of character-type selection keys comprising a language selection key for selecting a type of character keys for a spoken language;
based on receiving, through the touchscreen, a user touch input for one of the plurality of character-type selection keys of the second keyboard while displaying the first type of character keys and the second type of character keys, controlling to replace the second type of character keys of the second keyboard with a third type of character keys while displaying the first type of character keys of the first keyboard; and
controlling to display a plurality of characters in the character input area, wherein one character of the plurality of characters is inputted with a character key of the first type of character keys and another of the plurality of characters is inputted with a character key of the third type of character keys,
wherein the first type of character keys is for a first spoken language and the second type of character keys is for a second spoken language, and
wherein the first spoken language is different from the second spoken language.

26. The method of claim 25, wherein the plurality of character-type selection keys are maintained after replacing the second type of character keys of the second keyboard with the third type of character keys.

27. The method of claim 25, wherein an area for displaying the second type of character keys is different from an area for displaying the third type of character keys.

28. The method of claim 25, wherein the first keyboard and the second keyboard are disposed side-by-side and are oriented in a same direction on the touchscreen.

29. The method of claim 25, further comprising:
controlling to display characters in the character input area,
wherein the characters are inputted with at least one character key of the first type of character keys and at least one character key of the second type of character keys.

30. The method of claim 25, wherein a location of at least one of the first keyboard and the second keyboard is changed based on a touch and move input received through the touchscreen.

31. The method of claim 25, further comprising controlling to display, on the touchscreen, the first keyboard with a size changed based on another touch and move input received through the touchscreen.

32. The method of claim 25, wherein the controlling to display together the character input area and the second keyboard interface comprises controlling to automatically display together the character input area and the second keyboard interface.

\* \* \* \* \*